C. E. Hersey,
Shoe-Edge Plane.
Nº 44,093.  Patented Sep. 6, 1864.
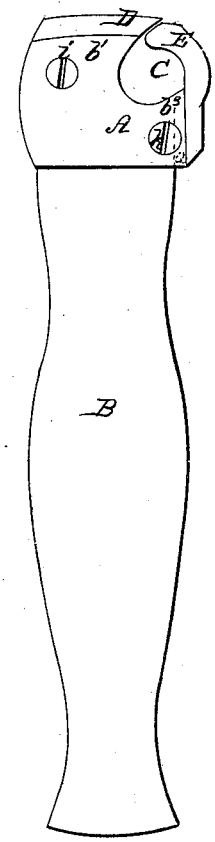
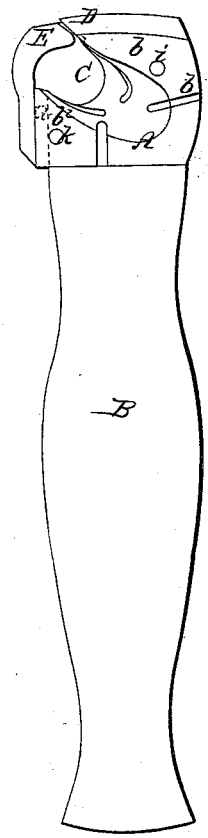
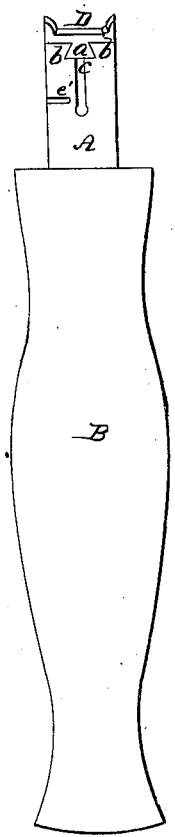
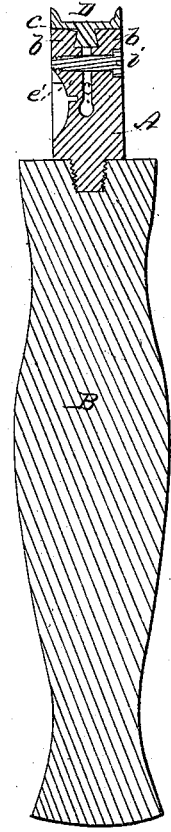
Witnesses.
Inventor

UNITED STATES PATENT OFFICE.

CHARLES E. HERSEY, OF EAST STOUGHTON, MASSACHUSETTS.

IMPROVED SHOE-MAKER'S EDGE-PLANE.

Specification forming part of Letters Patent No. 44,093, dated September 6, 1864.

*To all whom it may concern:*

Be it known that I, CHARLES E. HERSEY, a resident of East Stoughton, in the county of Norfolk and State of Massachusetts, have invented an Improved Shoe-Maker's Edge-Plane; and I do hereby declare the same to be fully described in the following specification and represented in the accompanying drawings, of which—

Figures 1 and 2 are elevations of opposite sides of it; Fig. 3, an end elevation, and Fig. 4 a transverse section, of it, this figure having its plane of section taken through the clamp-screw of its gage.

The nature of my invention consists in making the adjustable knife, as well as the adjustable gage thereof, of such edge plane with a dovetailed rib, and the stock to which they are confined with jaws and clamping-screws, whereby such rib or ribs may be held to the stock, the whole being as hereinafter described.

The object of my invention is to hold either of the movable or adjustable parts of the stock firmly, and so that it may be easily adjusted on the stock, or the two parts (the knife and the gage) be adjusted with respect to each other.

In the drawings, A denotes the stock, and B the handle thereof. The said stock is constructed with a throat or chip-passage, C, leading through it laterally, and, furthermore, it is provided with a movable knife, D, and gage E, which are arranged on the stock in the manner as represented in the drawings. The upper surface of the knife and its gage should be suitably shaped so as to impart to the edge of a sole, while being dressed by the knife, the proper or desirable form.

In carrying out my invention, I construct the knife D, as well as the gage E, with a dovetailed rib, $a$, extending along that edge or part of it which is to be placed against the stock. The rib of the knife is to enter between jaws $b\ b'$, made in the stock, and by means of a saw kerf or channel, $c$, which, where it receives the dovetailed rib, is to be dovetailed to correspond with and fit to it, jaws $b^2\ b^3$ are also formed in the stock, to receive and grasp the rib $a$ of the gage E. In order to enable the jaw $b$ to be sprung toward its fellow jaw, a saw kerf or recess, $e$, is made laterally into the stock, as shown in Fig. 3.

There is also such another saw kerf or recess, $e'$, made in one of the jaws $b\ b'$, by which the gage E is held to the stock. A clamp-screw, $i$, goes through one of the jaws $b\ b'$ and screws into the other. A similar clamp-screw, $k$, goes through the jaw $b^3$ and screws into the jaw $b^2$. By means of these screws the jaws may be closed with great firmness on the ribs when between them, as shown in the drawings. These jaws with the dovetailed ribs not only very strongly hold the knife and its gage to its stock, but enable either or both of them to be adjusted thereon or relatively to each other as circumstances may require.

When either the knife or the gage is held to the stock by a screw going through a slot in the stock, it is apt, while the edge-plane is in use, to be moved more or less out of place, and cannot be relied on to keep in its place, as it will when held by a dovetailed rib, jaws, and a clamping-screw.

With my improvement, the clamping-screw does not screw into either the gage or the knife, and therefore it is not liable to be moved by it while such knife and gage may be in use. While the dovetailed rib and jaws hold the knife and gage closely in place in the stock, and prevent them from dropping therefrom while being adjusted, the great extent of bearing-surface operates to great advantage in preventing any longitudinal movement of the said gage or knife relatively to the stock.

I do not claim an edge-plane as made in any manner as represented in the United States Patent No. 27,840, my invention being an improvement with reference thereto.

I claim—

My improved edge-plane, as explained—that is, as having its knife or cutter, as well as its gage, provided with a dovetailed rib, and its stock constructed with corresponding jaws, made in manner and provided with the notches $e\ e'$, and furnished with a clamping-screw, as described, the same being as and for the purpose or objects as hereinbefore explained.

CHARLES E. ×̲ HERSEY.
(his mark)

Witnesses:
 R. H. EDDY,
 F. P. HALE, Jr.